3,241,914
LITHIUM FLUORIDE PRODUCTION
Robert D. Goodenough, Midland, Mich., assignor to The Dow Chemical Company, Midland, Mich., a corporation of Delaware
No Drawing. Filed Dec. 4, 1964, Ser. No. 416,159
6 Claims. (Cl. 23—88)

This patent application is a continuation-in-part of U.S. patent application Serial No. 269,702, filed April 1, 1963, now abandoned.

This invention relates to an improved process for the production of lithium fluoride. More particularly, the present invention relates to an improved method of producing lithium fluoride from an aqueous lithium hydroxide solution such as that which results when lithium value is eluted from an acid cation exchange resin with an aqueous solution of a strong base.

A method of recovering lithium from lithium-bearing ores has been suggested in U.S. Patent 2,980,499. In the method therein suggested lithium is recovered from its acid soluble ores by mixing said ore with liquid water and strongly acidic cation exchange resin. Lithium hydroxide may then be obtained by eluting the resin with an aqueous hydroxide solution, such as sodium hydroxide, potassium hydroxide, calcium hydroxide, or the like.

It is an object of this invention to provide a relatively inexpensive method for producing lithium fluoride from lithium hydroxide solution.

Other objects and advantages will become apparent in accordance with the following specification.

The objects and advantages of the present invention may be obtained by mixing an aqueous lithium hydroxide solution with a soluble silicofluoride in amounts about stoichiometrically required to produce lithium fluoride while maintaining the pH value of the reaction mixture in the range of from about 12.5 to about 13.5 and the temperature of said mixture at a minimum of about 70° C. thereby precipitating lithium fluoride from solution. The relatively pure lithium fluoride precipitate can then be obtained by decanting the aqueous solution therefrom. Unexpectedly, a stoichiometric amount of lithium fluoride is produced with formation of substantially no insoluble lithium metasilicate ($Li_2SiO_3$). Typical soluble silicofluorides which are suitable for use in the instant novel process include, for example, sodium silicofluoride ($Na_2SiF_6$), fluosilicic acid ($H_2SiF_6$), potassium silicofluoride ($K_2SiF_6$), ammonium silicofluoride $$[(NH_4)_2SiF_6]$$

and the like.

In carrying out one embodiment of the instant novel method of producing lithium fluoride, sodium silicofluoride ($Na_2SiF_6$) is mixed with an aqueous lithium hydroxide solution in an amount about stoichiometrically required to react with the lithium hydroxide thereby precipitating lithium flouride from solution and leaving a solution containing sodum metasilicate ($Na_2SiO_3$). The reaction generally proceeds in accordance with the following equation:

$$6LiOH + Na_2SiF_6 \rightarrow 6LiF\downarrow + Na_2SiO_3 + 3H_2O$$

In general, the reaction is carried out at a pH of from about 12.5 to about 13.5. When a lower pH is employed, substantial amounts of insoluble lithium metasilicate may then be formed with a consequent reduction in efficiency of lithium fluoride production and subsequent recovery. Thus, hydroxyl ions should be present in the aqueous reaction mixture in the range of amounts from about at least that stoichiometrically needed to react with the soluble silicofluoride to about 100 percent in excess of said stoichiometric requirements. Where necessary to maintain the requisite pH of the reaction mixture the hydroxyl ion concentration of said mixture can be supplemented merely by adding a strong base thereto (for example, an alkali metal hydroxide other than lithium hydroxide such as soduim or potassium hydroxide).

Sodium silicofluoride or any of the other soluble silicofluorides mentioned hereinbefore may be added to the lithium hydroxide solution in the solid state, as an aqueous solution, or as a slurry. The amount of water to be used is governed by the solubility of the metasilicate formed by reaction of lithium hydroxide with the soluble silicofluoride. When using sodium silicofluoride ordinarily, an amount of water adequate to give a twelve percent solution of sodium metasilicate at a temperature of about 80° C. is sufficient.

The temperature of reaction is, of course, dependent on the solubilities of lithium hydroxide, the soluble silicofluoride and the metasilicate. Ordinarily, a temperature of from about 70° C. to the boiling point of the solution is appropriate.

One advantage of the present process is that sodium silicofluoride is usually found as a low cost by-product of the phosphate industry. Therefore, the raw material costs of the present process are considerably lower than those of a process which would employ hydrofluoric acid or sodium fluoride as sources of fluoride ions.

A better understanding of the present invention may be obtained in light of the following examples which are set forth to illustrate and are not to be construed to limit the present invention.

Example I

A slurry of about 10 grams of lithium hydroxide monohydrate (about 97.4 weight percent pure) in about 80 milliliters of water (that is about 0.232 moles of LiOH) was added to a slurry of about 7.32 grams of sodium silicofluoride (about 99.4 weight percent pure) in about 60 milliliters of water. Thus about 0.0387 moles of $Na_2SiF_6$ was present or about that amount stoichiometrically required to react with the LiOH in accordance with the equation $$Na_2SiF_6 + 6LiOH \cdot H_2O \rightarrow 6LiF\downarrow + Na_2SiO_3 + 9H_2O$$

In addition about 18.58 grams of a sodium hydroxide solution was added to the reaction mixture, said solution containing about 50 weight percent NaOH which is equivalent to 9.29 grams NaOH (anhydrous).

The ractants were stirred for about 15 minutes while maintaining the reaction temperature at about 80° C. A precipitate of substantially lithium fluoride was formed and filtered from the hot solution. The solids were collected and washed twice with small portions of distilled water. The pH of the cooled mother liquor was about 13.3.

About 6.35 grams of dry product was recovered and when analyzed by X-ray diffraction techniques was found to contain more than 90 weight percent LiF, less than about 5 weight percent $Na_2SiF_6$, less than 0.5 weight percent $Li_2SiO_3$ and substantially no NaF.

Thus it is seen that a lithium fluoride yield of about 99 weight percent of the theoretical maximum recovery of lithium fluoride was obtained. Further the lithium fluoride product was substantially free of lithium metasilicate and sodium fluoride.

Example II

A procedure was followed similar to that carried out in Example I except that no sodium hydroxide solution was added to the reaction mixture. The reaction mixture was maintained at a pH value of about 12.2 (which is outside the operative pH range as taught hereinbefore).

About 6.02 grams of dry product was recovered and when analyzed was found to contain more than 70 weight percent LiF, from about 5 to about 10 weight percent NaF, about 0.5 weight percent $Li_2SiO_3$ and 20–30 percent $Na_2SiF_6$. A lithium fluoride yield of about 70 percent of the maximum theoretical recovery was obtained.

Thus, it is seen that when operating outside the preferred pH range of the instant novel method, the purity of the product recovered decreases.

*Example III*

A procedure similar to that described in Examples I and II was carried out except an excess of sodium silicofluoride of about 10 percent more than stoichiometrically needed to react with the lithium hydroxide was used. Furthermore, enough sodium hydroxide solution was added to the reaction mixture to maintain the reaction mixture at a pH value of about 12.7.

About 6.02 grams of product was recovered and when analyzed was found to contain more than 80 weight percent LiF, from about 10 to 20 weight percent $Na_2SiF_6$, less than 5 weight percent NaF and less than about 0.5 weight percent $Li_2SiO_3$.

Thus, a lithium fluoride yield of about 80 percent was obtained. However, with excess sodium silicofluoride used, the product was contaminated with sodium fluoride and sodium silicofluoride.

*Example IV*

Treatment of the lithium hydroxide solution can be carried out as shown in Example I substituting fluosilicic acid, potassium silicofluoride, or ammonium silicofluoride for the sodium silicofluoride therein employed, if desired, to give a lithium fluoride product having substantially the same characteristics as the product described in said Example I.

Various modifications may be made in the present invention without departing from the spirit or scope thereof, and it is to be understood that I limit myself only as defined in the appended claims.

What is claimed is:

1. A method of producing lithium fluoride which comprises: (1) providing an aqueous solution of lithium hydroxide; (2) providing a soluble silicofluoride; (3) mixing said lithium hydroxide solution, while maintaining a temperature of from about 70° C. to the boiling point of the solution and a pH of from about 12.5 to about 13.5, with an amount of said soluble silicofluoride about stoichiometrically required to react with the lithium hydroxide thereby precipitating lithium fluoride in the reaction mixture; and (4) recovering said lithium fluoride precipitate substantially free of lithium metasilicate from said mixture.

2. A method of producing lithium fluoride which comprises: (1) providing an aqueous solution of lithium hydroxide; (2) providing sodium silicofluoride; (3) mixing said lithium hydroxide solution, while maintaining a temperature of from about 70° C. to the boiling point of the solution and a pH of from about 12.5 to about 13.5 with an amount of said sodium silicofluoride about stoichiometrically required to react with the lithium hydroxide, thereby precipitating lithium fluoride in the reaction mixture; and (4) recovering said lithium fluoride precipitate substantially free of lithium metasilicate from said mixture.

3. The method in accordance with claim 1 wherein said reaction mixture is maintained at a temperature of about 80° C.

4. A method of producing lithium fluoride which comprises: (1) providing an aqueous solution of lithium hydroxide; (2) providing potassium silicofluoride; (3) mixing said lithium hydroxide solution, while maintaining a temperature of from about 70° C. to the boiling point of the solution and a pH of from about 12.5 to about 13.5, with an amount of said potassium silicofluoride about stoichiometrically required to react with the lithium hydroxide thereby precipitating lithium fluoride in the reaction mixture; and (4) recovering said lithium fluoride precipitate substantially free of lithium metasilicate from said mixture.

5. A method of producing lithium fluoride which comprises: (1) providing an aqueous solution of lithium hydroxide; (2) providing ammonium silicofluoride; (3) mixing said lithium hydroxide solution, while maintaining a temperature of from about 70° C. to the boiling point of the solution and a pH of from about 12.5 to about 13.5, with an amount of said ammonium silicofluoride about stoichiometrically required to react with the lithium hydroxide, thereby precipitating lithium fluoride in the reaction mixture; and (4) recovering said lithium fluoride precipitate substantially free of lithium metasilicate from said mixture.

6. A method of producing lithium fluoride which comprises: (1) providing an aqueous solution of lithium hydroxide; (2) providing fluosilicic acid; (3) mixing said lithium hydroxide solution, while maintaining a temperature of from about 70° C. to the boiling point of the solution and a pH of from about 12.5 to about 13.5, with an amount of said fluosilicic acid about stoichiometrically required to react with the lithium hydroxide, thereby precipitating lithium fluoride in the reaction mixture; and (4) recovering said lithium fluoride precipitate substantially free of lithium metasilicate from said mixture.

References Cited by the Examiner

UNITED STATES PATENTS

| | | | |
|---|---|---|---|
| 2,584,895 | 2/1952 | MacIntyre | 23—88 |
| 2,980,499 | 4/1961 | Goodenough et al. | 23—32 |
| 3,024,086 | 3/1962 | Cines | 23—88 |
| 3,132,922 | 5/1964 | Goodenough et al. | 23—88 |

FOREIGN PATENTS

| | | |
|---|---|---|
| 1,010,504 | 6/1956 | Germany. |

MAURICE A. BRINDISI, *Primary Examiner.*